United States Patent [19]

Bratten

[11] Patent Number: 5,094,760
[45] Date of Patent: Mar. 10, 1992

[54] LIQUID FILTER APPARATUS AND METHOD

[76] Inventor: Jack R. Bratten, 5970 St. James Dr., West Bloomfield, Mich. 48322

[21] Appl. No.: 593,691

[22] Filed: Oct. 5, 1990

[51] Int. Cl.$^5$ .............................................. B01D 25/34
[52] U.S. Cl. ................... 210/770; 210/791; 210/225; 210/228; 210/231; 210/346; 210/387; 210/398; 100/197; 100/198; 100/211
[58] Field of Search ............... 210/224, 225, 227, 331, 210/346, 387, 398, 770, 783, 791, 228; 100/194, 197, 198, 211

[56] References Cited

U.S. PATENT DOCUMENTS

| | | | |
|---|---|---|---|
| 3,608,734 | 9/1971 | Schneider | 210/387 |
| 4,430,231 | 2/1984 | Bratten | 210/386 |
| 4,446,020 | 5/1984 | Kurita | 210/225 |
| 4,568,460 | 2/1986 | Bratten | 210/387 |
| 4,721,040 | 1/1988 | Mau | 100/194 |
| 4,861,494 | 8/1989 | Bratten | 210/138 |

Primary Examiner—W. Gary Jones
Assistant Examiner—Matthew O. Savage
Attorney, Agent, or Firm—John R. Benefiel

[57] ABSTRACT

A pressurized liquid filter in which a series of spaced apart, vertically extending filter plates are mounted between the sides of housing, inflatable hose seals extending across each top entrance and bottom exit. Filter media strips are draped vertically into the spaces, each disposed over a perforated sheet forming the outer layer of either side of each filter plate. The space between each pair of filter plates is subdivided into two filtering chambers by a dual element dewatering diaphragm mounted in a frame disposed centrally in each space. Liquid slurry is introduced into each chamber under pressure, flow induced to pass through the filter media strips and passing into vertical passages in the filter plates and into collection troughs extending along each row of passages. The filter media strips are held by carrier belts mounted on powered rollers at the top of each pair of filter chambers to enable the strips to be lowered out of the chambers when the hose seals are retracted after each filtering cycle, and thereafter again raised into position, being scraped and washed prior to being raised into the chambers preparatory to another filter cycle.

15 Claims, 5 Drawing Sheets

LIQUID FILTER APPARATUS AND METHOD

The present invention concerns filtering apparatus and methods, and more particularly such apparatus and methods in which a liquid to be filtered is introduced under pressure into each of a series of chambers defined in part by a filtering medium, the liquid caused to flow through the medium under pressure to be filtered.

Such filters are in widespread use in industry and often are of the so-called "plate and frame" type in which a strip of fabric constitutes the filtering media, and a series of separable housing plates defining filter chambers are used to clamp the edges of the filter fabric strip during filtering, the plates moved apart periodically to allow the filter media to be transported out of the filter chambers to enable removal of the accumulated filter cake and cleaning of the fabric.

Both horizontal and vertical plate designs are well known, as shown in U.S. Pat. No. 3,608,734 issued on Sept. 28, 1971 for a "Liquid Filtering Apparatus" and U.S. Pat. No. 3,499,532 issued on Mar. 10, 1970 for "Liquid Filtering Apparatus".

The need for mechanically separating each filter plate greatly complicates the apparatus, increasing its costs and reducing reliability.

The present inventor has heretofore patented an improved pressurized liquid filter in U.S. Pat. No. 4,430,231 issued on Feb. 7, 1984 for a "Filtering Apparatus and Method" and U.S. Pat. No. 4,568,460 issued on Dec. 10, 1984 for "Filter Apparatus and Method". In this design the filter housing, members are fixed and do not separate, but rather a series of inflatable hoses are employed along entrance and exit spaces on either side of the filter chambers defined between successive filter housing members to seal the openings during filtration. The hose seals are evacuated after a filter cycle to open the entrance and exit spaces, allowing the fabric strips and accumulated filter cake to be transported out of the filter chambers.

This invention thereby eliminates the need for housing member separation and thus results in considerably simpler apparatus.

In this design, each hose seal is used to seal a single filtering chamber, and the high pressure within the sealed filter chamber is exerted against the inside surface of the hose seal. The hose seal is held at the top to be cantilevered, such that the force of the pressure acts across the width of the cantilevered hose seal tending to twist the hose seal, making stabilization of the hose seal position difficult.

It would be advantageous to reduce the number of hose seals required, since each seal involves separate plumbing connections and careful fitted assembly into the filter apparatus.

SUMMARY OF THE INVENTION

The present invention comprises a liquid filter apparatus and method in which a back to back series of vertical, spaced apart planar filter plates define intermediate filter spaces, with a pair of strips of fabric filter media draped between the filter plates, one over a perforate cover sheet on the opposing sides of the facing filter plates, filtered liquid passing through the filter media strips and thence through the cover sheets on either side of the filter plate. Each filter plate includes a perforate cover sheets on either side, sandwiching a central support and liquid collecting structure, which are each directly overlain by one of the pair of vertically draped filter media strips interposed between each filter plate. The support structure of each filter plate is provided with a series of vertical passages, collecting the filtered liquid passing through the filter media strips and cover sheets on either side of the filter plate. The space between successive filter plates is subdivided by a dual element diaphragm each adapted to be inflated against a respective facing filter media strip and of the opposite facing filter plates.

An upper and lower hose seal extends between each successive pair of filter plates through openings in opposite side plates comprising in part a filter housing, so that only a single pair of hose seals is required for each two filter chambers, defined between each diaphragm element and the respective facing filter strip and perforate plate.

The opposite surfaces of each hose seal exert a sealing pressure so as to be symmetrically loaded by the chamber pressure during filtering. Thus, backing support plates can be mounted edgewise centered outside each hose seal to stabilize the seals against the force exerted by the pressurized liquid in the filter chamber.

The filter media strips are held by carrier belts adapted to be wound up and down from a series of rollers, each roller receiving both of the pair of filter media strip draped between successive pairs of filter plates. A common belt or chain drive can be employed to rotate all of the rollers in the apparatus.

The lower ends of each pair of filter media strips are connected and are looped around shafts acting as weights insuring that the filter media strip pairs descend out of the filter chambers when the hose seals are deflated and the rollers rotate to pay out the carrier belts. The accumulated filter cake thus moves out of the filter chambers as the filter media strip pairs move down.

Scrapers are positioned to remove the filter cake from the filter media, and washer jets clean the filter media strips as the filter media strip pairs move down and back up into the chambers preparatory to each new filter cycle.

The hose seals are preferably supported on elongated, ribbed tension bars extending within each hose seal, each bar having plugs fixed at either end clamped to an end of the hose seal. The connection of the plugs to the tension bar acts to neutralize the endwise but oppositely directed forces acting on the hose seal plugs. The ribbed contour of the tension bars controls the collapse of the hose seals during evacuation to insure that the openings are unobstructed, allowing movement of the cake and filter media strips past the retracted hose seals. Adjustable position elements are mounted within the backing support plates at the hose seal openings in the housing side plates, insuring a proper sealing fit of the hose seal to the openings.

The filter plates are preferably slidably fit to mounting bars welded to the side plates to facilitate manufacture and allow removal of individual filter plates.

Header spray pipes are closely positioned to the filter media strips adjacent each exit opening, and a stream of cleaning liquid is directly out from a lengthwise slot in each filter media pipe to wash the strips after each cycle.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
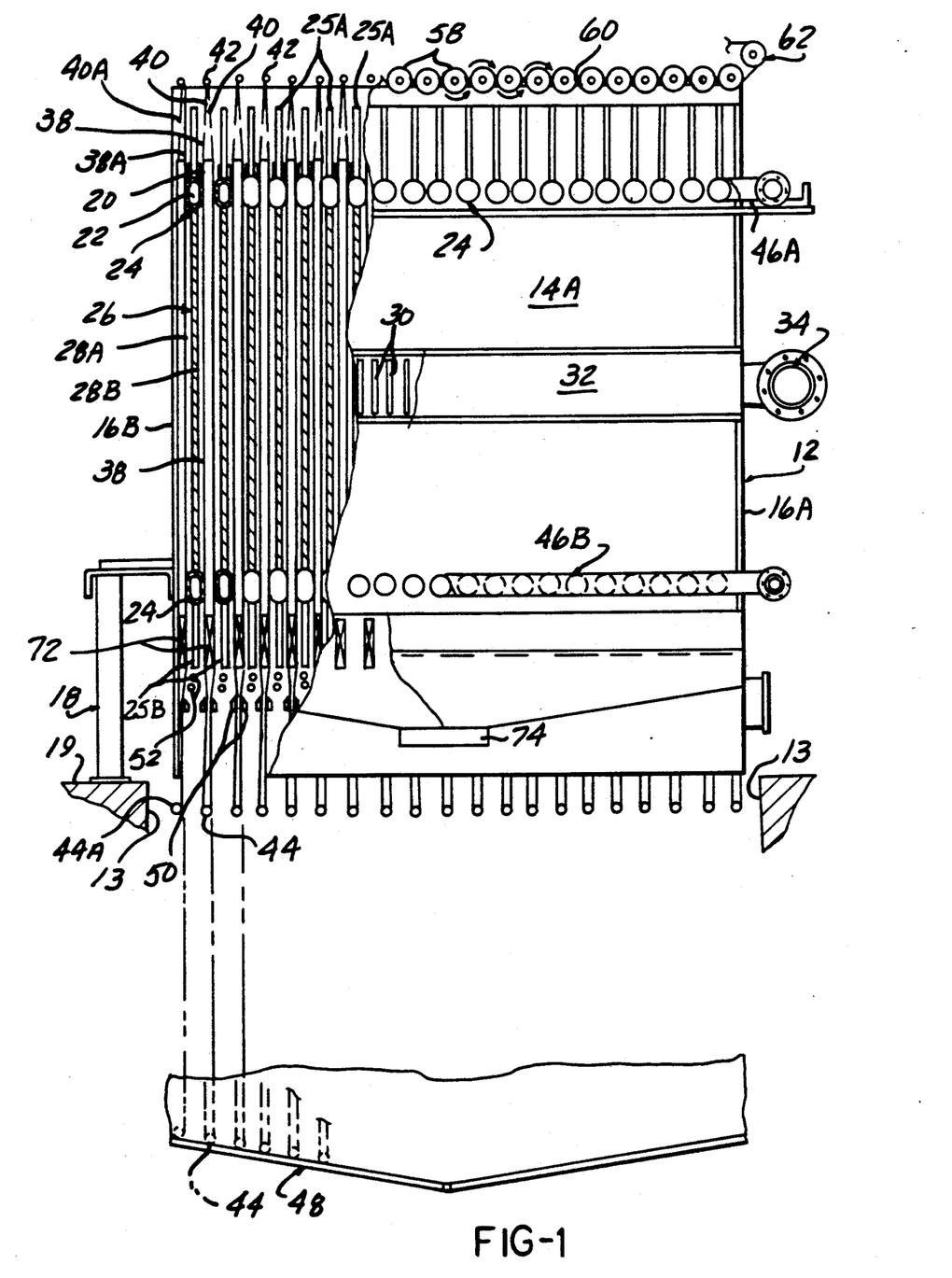
FIG. 1 is a side elevational view of the filter according to the present invention with portions of the housing broken away and with associated components depicted diagrammatically.
Figure 2:
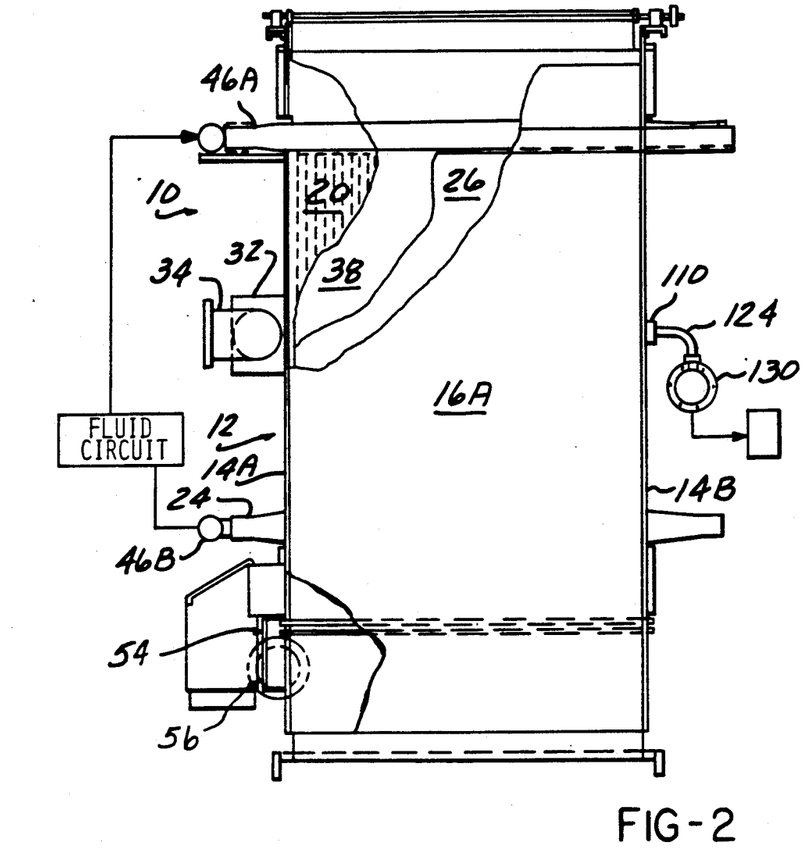
FIG. 2 is a front elevational view of the filter shown in FIG. 1.

Referring to FIGS. 1 and 2 the filter 10 according to the present invention includes a housing 12, typically constructed of $\frac{1}{4}$" stainless steel plate, in an open ended box shape, including opposite side plates 14A, 14B welded at the corners to front and rear plates 16A, 16B.

The housing 12 can be supported by a series of stanchions 18 resting on a support surface 19 adjacent an opening for pit over which the housing 12 supported.

Mounted extending top to bottom and fixed within the box, is a parallel series of spaced apart, back to back filter plates 20 extending the full width of the space between the side plates 14A, 14B.

A series of oppositely aligned flattened oval openings 22 are formed across in a line extending across the top and bottom of each of the side plates 14A, 14B. Disposed within each pair of aligned openings 22 is a hose seal 24 extending lengthwise horizontally through the space between the upper and lower ends of the filter plates 20. The hose seals 24 are constructed as described in the above-referenced U.S. patents to the present inventor, i.e., from flexible industrial hose reinforced to withstand the high pressures at which the filter will operate, as much as 300 psi or even higher.

Opposite surfaces of the hoses 24 are disposed against the opposite facing surfaces of successive filter plates 20.

The outside surfaces of the hose seals 24 are abutted against backing support plates 25A, 25B which are attached at either end to side plates 14A, 14B. The upper plates 25A should be releasably assembled to plates 14A, 14B while the lower support plates 25B may be welded thereto.

The backup support plates 25A, 25B resist the bending of the hose seals 24 under the pressure exerted in the spaces between the filter plates 20. The connection to the side housing plates 14A, 14B allow counterbalancing of the forces against each other, loading the sides 14A, 14B in tension.

The space between each filter plate 20 is subdivided by a generally planar dual diaphragm assembly 26 disposed midway between each pair of filter plates 20, each extending the full width of the space between the side plates 14A and 14B and the full distance from the lower to the upper hose seals 24.

A pair of filtering chambers 28A and 28B are thereby defined between each pair of filter plates 20 with the hose seals 24 sealing the top and bottom thereof.

Figure 9:
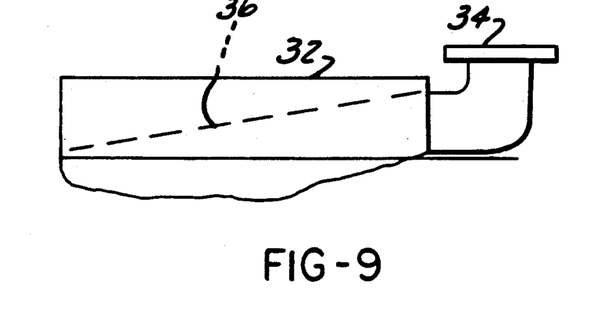
FIG. 9 is a plan view of the liquid slurry supply plenum.

Liquid to be filtered is introduced into the filtering chambers via a series of slits 30 cut centrally into side plate 14A and lying under a slurry feed plenum 32 supplied from a feed pipe 34. The slurry feed plenum 32 is preferably provided with a baffle 36 progressively reducing cross sectional area and thereby increasing the pressure at more remote slits 30, as seen in FIG. 9, so as to substantially equalize the flow to each set of chambers 28A, 28B during the initial filling flow.

Draped over each surface of each filter plate 20 is a filter media strip 38 which may be comprised of a tightly woven filter fabric extending from the top in between the spaces and into each filtering chamber 28A, 28B. Each filter media strip 38 is held by a carrier belt 40 wound in pairs around a roller 42.

The filter media strips 38 extending entirely through their respective chambers 28A or 28B and to a point below the housing 12.

Pairs of media strips 38 on either side of each filter plate 20 are connected with each other at their lower ends passing around a shaft weight 44. At either side of the housing 12, single filter media strips 38A are fixed to a single carrier belt 40 and shaft weight 44A.

Each of the upper and lower hose seals 24 are connected to a fill and evacuate header piper 46A, 46B connected to a fluid circuit supplying fluid under pressure to inflate the hoses 24 preparatory and during each filter cycle and evacuate the same to deflate and retract the hoses after each cycle.

A suitable fluid circuit and controls is set out in applicant's prior U.S. Pat. No. 4,861,494 issued on Aug. 29, 1989 for an "Automatic Cycle Control Arrangement and Method for a Pressure Filter".

After the hose seals 24 are retracted, the filter media strips 38 are lowered out of their respective chambers 28A, 28B, carrying out the accumulated cake which drops into a pair of "bomb bay" doors 48 for collection and removal. Scraper bars 50 may also be used to facilitate removal of the cake from the strips 38 (See FIG. 8).

Washer header pipes 52 are supplied with clean liquid from a supply pipe 54 and plenum 56 and direct a spray of clear liquid at the filter media strips 38 as they are raised by winding of the rollers 42 and wrap up of the carrier belts 40.

The rollers 42 are powered by a belt chain drive consisting of a sprocket 58 attached at one end of each roller 42 with a chain circulating around each sprocket 58 and a drive sprocket 62 which powers the chain to rotate each sprocket 58.

This enables powered unwinding and winding of the carrier belts 40 to lower and raise the media strips 38 as the filter is cycled.

Figure 3:
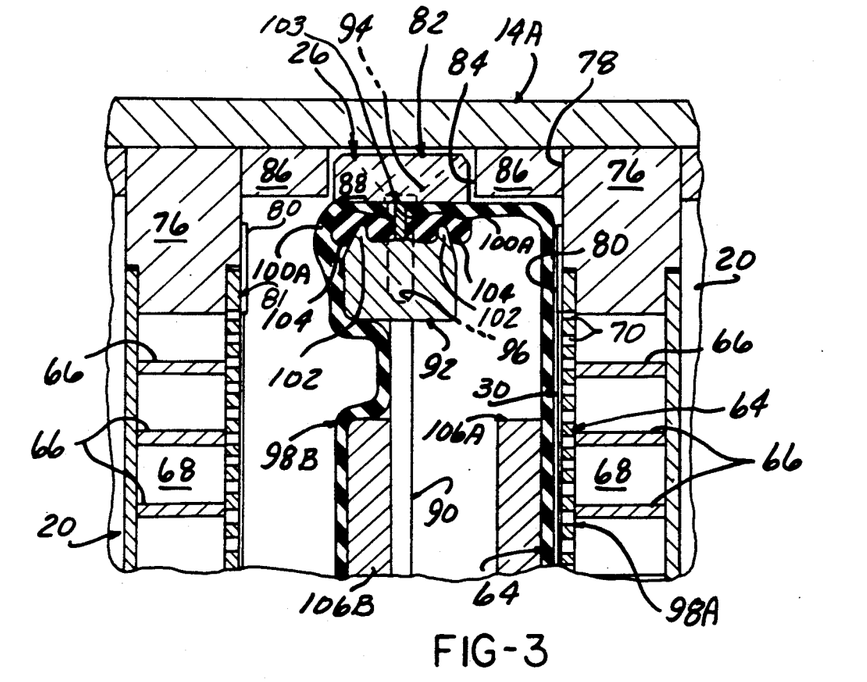
FIG. 3 is an enlarged sectional plan view of a fragmentary portion of a pair of successive filter plates and intermediate dual diaphragm assembly, showing one diaphragm of the assembly inflated and the other deflated and retracted for illustrative purposes.

As seen in FIG. 3, each filter plate 20 is constructed of outer perforated cover sheets 64 welded on either side of an array of vertically extended spacer bars 66, which define collection spaces 68.

The cover sheets 64 and spacing of the bars 66 must be such as to form a sufficiently rigid structure to resist the designed for filter pressure, since the spaces 68 are unpressurized. Stainless steel sheet of ¼ or ⅛ inch thickness can be employed with greater or lesser spacing of the bars 66. Holes 70 are formed in the cover sheets 64 over the major extent thereof receiving flow passing through the overlying filter media strip 38.

Figure 8:
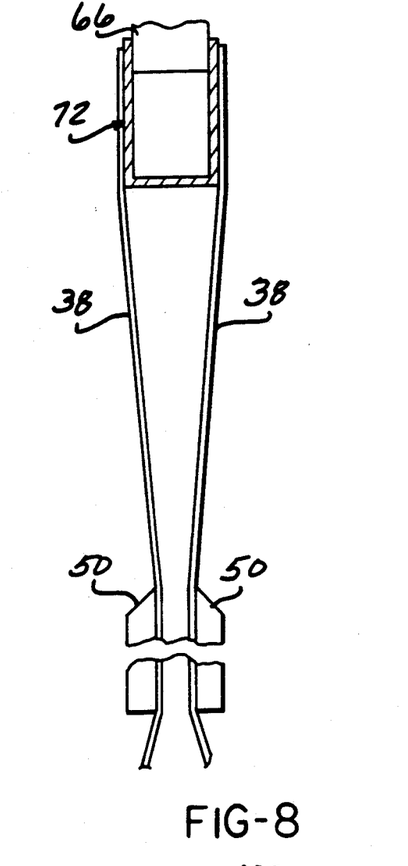
FIG. 8 is an enlarged endwise view of an effluent collection trough and lower segment of an associated filter media strip.

Flow of filtered liquid then passes down through the spaces 68 to collection troughs 72 disposed beneath row of spacer bars 66 (See FIG. 8). The troughs 72 direct the flow out of an open end to a collecting plenum directing the effluent to the utilizing system through a discharge 74.

Each pair of cover sheets 64 has the lateral ends slidably fit over a guide bar 76 welded to the inside of each plate 14A, 14B. The welds should be continuous to prevent leakage past the hose seal 24 from escaping behind the guide bars 76.

The filter media strip 38 extends to completely overlie the perforated regions of the associated cover sheet 64 and has a sealing edge 80 of non-porous construction overlying the solid border 81 of the cover sheet 64 and onto the solid guide bar 76 (FIG. 3). Pressure causes sealing of the imperforate edges 80, and prevention of leakage around the filter media sheets as described in U.S. Pat. No. 4,468,460 mentioned above.

Each dual diaphragm assembly 26 includes an outer rectangular frame 82 having opposite sides received in vertical recesses 84 formed by a space between bars 86 welded to the inside of the side plates 14A, 14B.

The frame 82 includes bars 88 arranged in a rectangular shape and the ends thereof welded to each other. An inner rectangular web plate 90 is welded to a series of clamping bars 92. The clamping bars 92 are secured with spaced screws 94 seated in threaded bores 96 in the outer side of the clamping bars 92.

A pair of diaphragms 98A and 98B are mounted back-to-back on either side of the web plate 90, each having sides 100, 101 clamped between the clamping bars 92 and frame 82.

The clamping bars 92 are formed with raised lips 102 compressing the diaphragm side 100.

A partition rib 103 projects towards the frame members 82, controlling the degree of compression of the diaphragm sides 100A and also comprising locating features insuring that each diaphragm is fully advanced to the center of the clamping bar 92.

Figure 6:
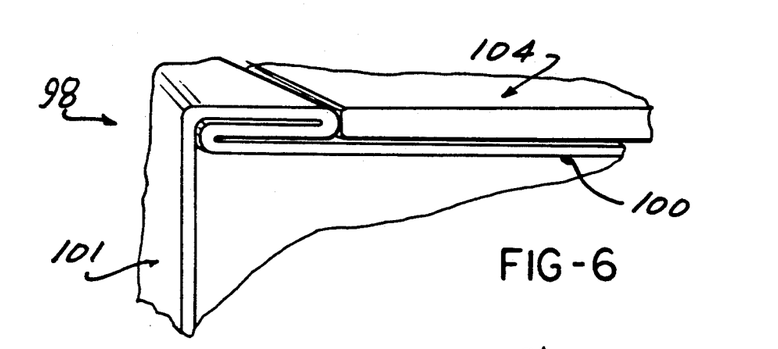
FIG. 6 is a fragmentary perspective view of a corner of a diaphragm showing the folded construction thereof.

Each diaphragm 98A, 98B is constructed from folded flat stock in a generally similar fashion as described in U.S. Pat. No. 4,721,040 issued on Jan. 26, 1988, except that the clamping is on the sides 100, 101 of the generally dished shape. The corners are folded as shown in FIG. 6 to pull up the sides 100, 101. Since a triple thickness is created at the corners by the folds, a spacer strip 104 is glued to sides 100A to create a uniform thickness along the side.

Spacer sheets 106A, 106B are adhered to the inside of each diaphragm 98A, 98B respectively to control the depth of the retracted diaphragm and to create a valley intermediate the clamping bar 92 and the spacer sheets 106A,B to receive the excess material to prevent folding or wrinkling.

Figure 4:
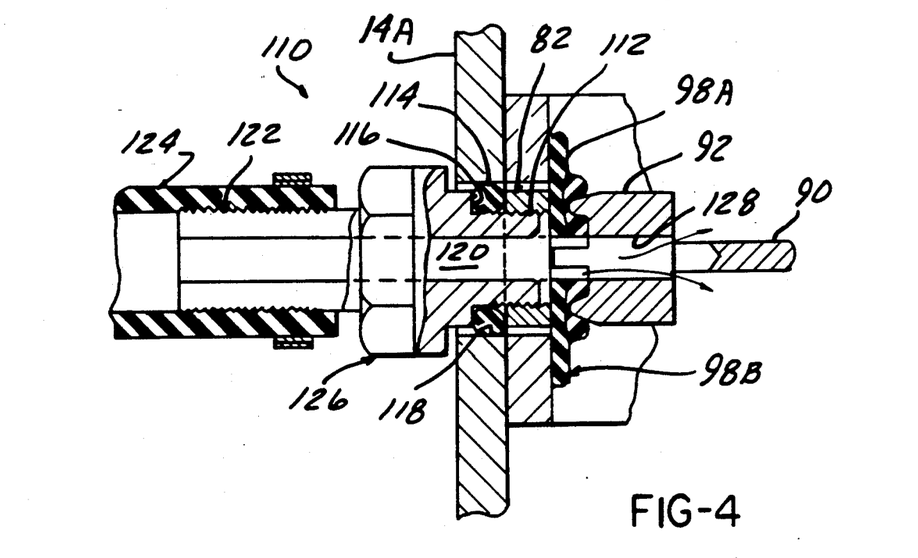
FIG. 4 is an enlarged sectional view through a typical diaphragm fluid inlet fitting.

As seen in FIG. 4, fluid is introduced into and withdrawn from the space between the diaphragms 98A, 98B via fittings 110 having a section 112 threaded into the frame member 82.

An O-ring 114 is compressed in a space between member 82 and a shoulder 116, which is compressed against inside diameter of a clearance hole 118 formed in the plate 14A to seal the opening. A central bore 120 passes into a pipe nipple section 122 clamped to a supply hose 124.

A wrenching hex shape is formed on the main body section 126 of the fitting 110.

Bore 120 is aligned with a drilled hole 128 extending through the edge of the diaphragms 98A, 98B and clamping bar 92 into the web plate 90. This produces an inlet passage to the interior of each of the diaphragms 98A, 98B for inflation and evacuation thereof.

A diaphragm fill and retract header 130 allows fluid flow in and out of fittings 110 for inflation and evacuation of the diaphragms 98A, 98B.

Figure 5:
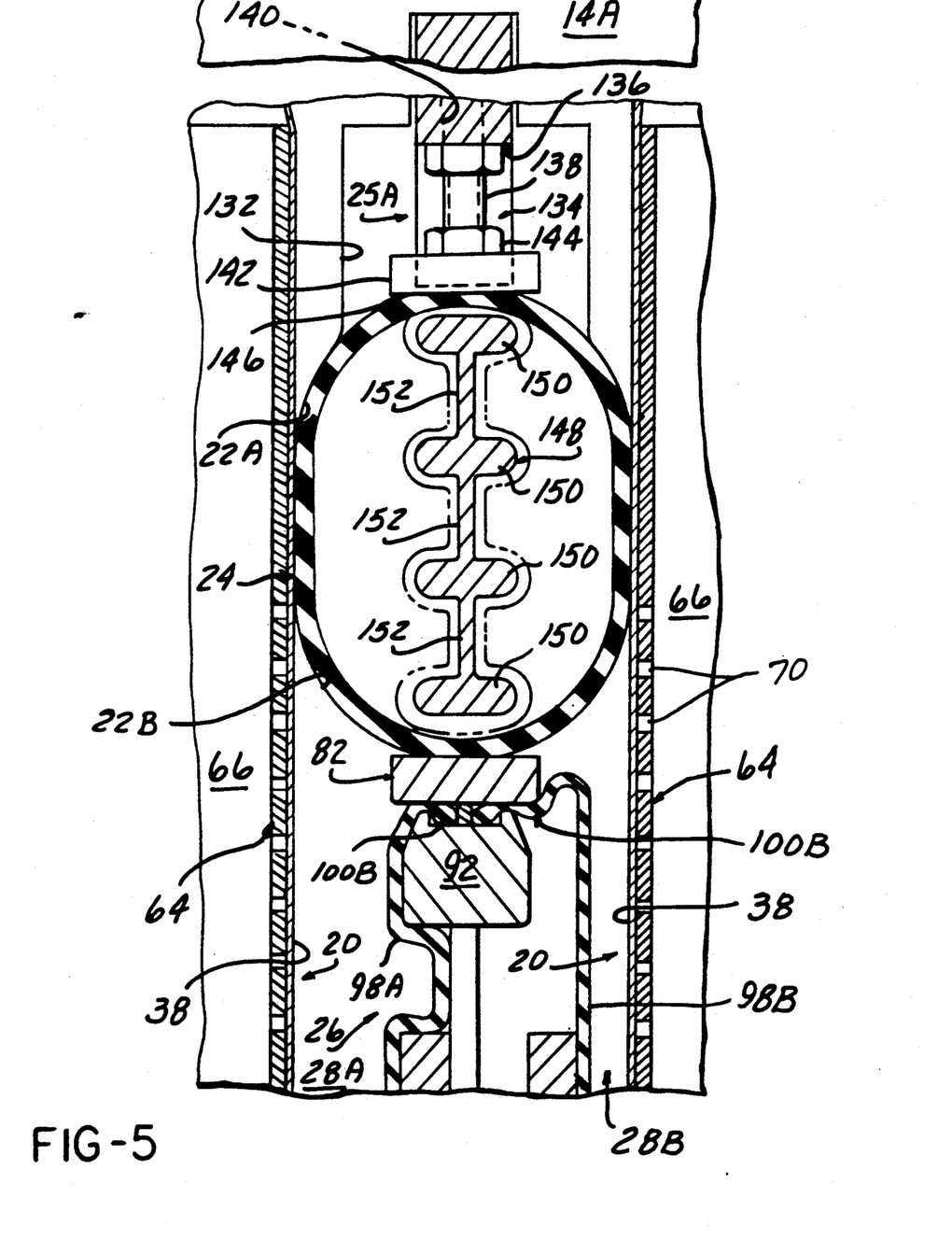
FIG. 5 is an enlarged endwise view of a typical hose seal installation and adjacent dual diaphragm assembly, the hose seal shown inflated and in phantom in the retracted position.

FIGS. 5 shows the details of the top and bottom sides o the dual diaphragm assembly 26 adjacent the hose seals 24. The frame 82 abuts the inside of the hose seals 24 when the seals 24 are inflated.

The perforated plates 64 are solid in the regions of contact with and outboard of the inflated hose seals 24 as shown in FIG. 5.

The housing side plates 14A, 14B seal openings 22 having a cut out 132 in the region 22A opposite the inner or sealing side 22B of the opening to each accommodate an adjustment device 134. Each adjustment device 134 is mounted within a notch 136 in a backing support plate 25A, 25B aligned with the housing side plates 14A, 14B and the perimeters of the seal openings 22.

The adjustment devices 134 are used to effectively precisely adjust the circumference of the openings 22 to the circumference of the hose seal 24 and insure a perfect seat between the inflated hose seals 24 and the perimeter of the openings 22 in the side plates 14A, 14B.

A threaded plug 138 is received in a threaded bore 140 extending into the backing support plate 25A back from the notch 136. A hose pressing plate 142 is welded to a wrenching head 144 integral with threaded plug 138, which has an outer face 146 which will press against the outside of the hose seal 24 when the hose seal 24 is inflated. By advancing or retracting the plug 138 in the threaded bore 140, the element 142 is advanced or retracted and a perfect sealing engagement of the hose seal 24 with the sealing portion 22B of the opening 22 can be obtained.

A contoured tension bar 148 extends within each hose seal 24 for the full length of the hose seal 24. A series of ribs 150 are connected by webs 152 to create a serpentine contour across the width of the tension bar 148. The serpentine shape controls the collapse of the hose seal 24 when retracted, as shown in FIG. 5 in phantom, so that the folds occur around the ribs 150. This insures that the clearances on either side of retracted hose seal 24 remain unobstructed, i.e., that no random folds of the hose seal impinge into the width of the filtering chambers 28A, 28B and allow movement of the filter cake out of the chambers 28A, 28B.

Figure 7:
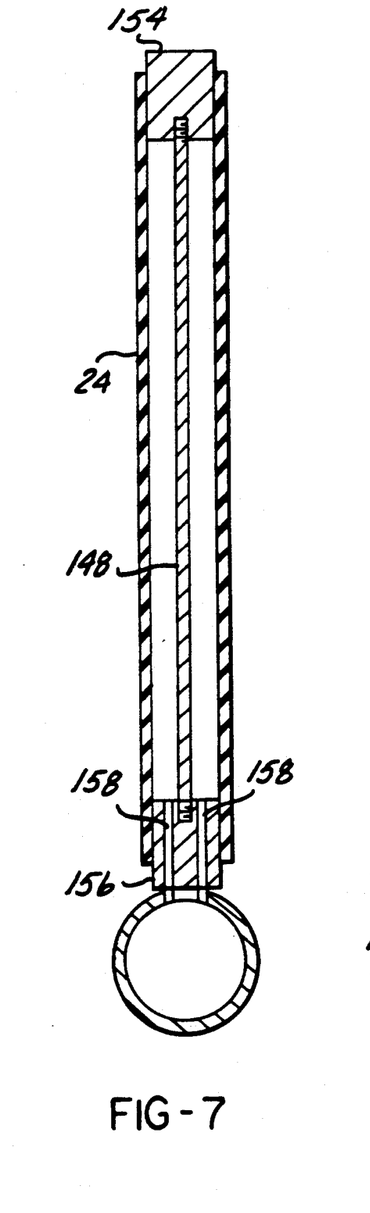
FIG. 7 is a transverse sectional view through a hose seal showing the support bar and end plugs, as well as the manifold pipe for directing fluid to inflate and evacuate the hose seals.

FIG. 7 shows that the tension bar 148 is fixed at either end to plugs 154, 156 each received within a respective end of the hose seal 24 and clamped thereto. The plugs 156 are each welded to the header pipes 46A or 46B and supply passages 158 allow in and out flow of inflating fluid from the header pipe 46A or 46B.

The tension bars 148 neutralize the end wise thrust generated by pressure in the hose seals 24 by exerting opposite thrust against each other.

Figure 10:
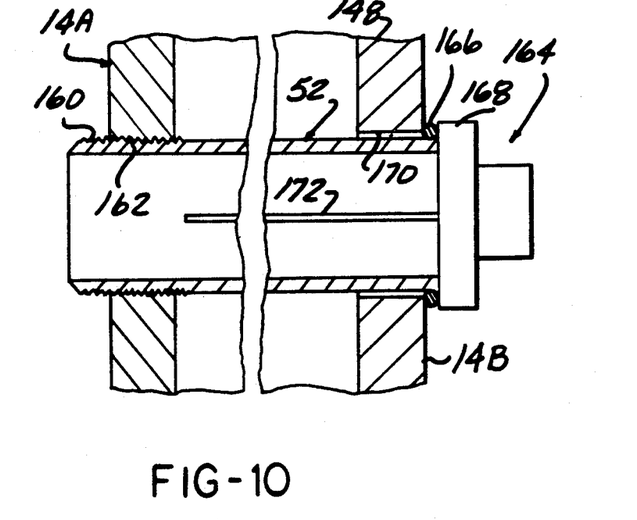
FIG. 10 is a lengthwise sectional view through either end of a filter media strip wash header pipe.
Figure 11:
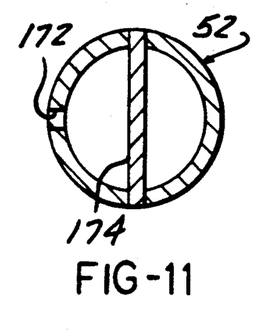
FIG. 11 is a transverse sectional view through a filter media strip wash header pipe.

Special header spray pipes 52 are used to insure close positioning of the pipes 52 to the filter media strips 38 and maximizing of the impingement pressure. Each spray pipe 52 has a threaded end 160 threaded into a bore 162 in one side plate 14A projecting in a supply header, using a wrenching feature 164 at the other end. A seal 166 is compressed beneath a flange 168 welded to the end of the spray pipe 52 to seal the clearance hole 170. A lengthwise slit 172 is cut into each spray pipe 52 facing the respective filter media strip 38 and constitutes the outlet for generating the washing jet.

The washing spray header pairs have their slits facing in alternate directions to face respective filter media strips 38.

The slits 172 may be formed by sawing a cut in the header 52, and clamping the header 52 onto a feeler gauge to establish accurately the width of the slit 172. This may be fixed by drilling a through cross hole and inserting a pin 174 therein and welding it while the clamp is still in place, to securely hold the slit width.

The sequence of operation and the controls is very similar to that set out in the above patents, and hence is not here described in detail.

Essentially, after hose seals 24 are inflated and diaphragms 98A and 98B retracted, liquid slurry is introduced under high pressure to the chambers 28A and 28B, causing flow through the filter media strips 28 and perforated cover sheets 64, passing into the spaces 68 between the spacer bars 66, flowing vertically down into troughs 72, and collected for system use.

After a predetermined period of filtering, the slurry flow is discontinued, the diaphragms 98A, 98B are inflated to dewater the cake, subsequent air injection often employed to further dry the cake. The hose seals 24 and diaphragms are retracted allowing the cake to move out with lowering of the filter strips 38 out of the chambers 28A, 28B.

The filter media strips 38 are scraped and washed as they are moved out and back into the chambers 28A, 28B preparatory to another cycle.

Those skilled in the art will appreciate that the nature of the slurry will effect the mode of conducting the filter process described, particularly as it relates to dewatering of the cake, i.e., the extent of diaphragm pressure and air injection.

I claim:

1. Liquid filtration apparatus comprising:
   a housing;
   a series of aligned and parallel filter plates disposed in said housing, each plate disposed vertically and intermediate spaces formed between each adjacent pair of filter plates defining filter chambers, each chamber having a top and bottom;
   each filter plate comprised of a pair of cover sheets having openings to allow flow therethrough, and a generally planar support structure, said cover sheets sandwiching said support structure therebetween, said support structure defining vertical flow collection passages receiving flow through each of said cover sheets;
   said housing including a pair of parallel side plates extending along respective opposite vertical edges of each of said filter plates in said series, and means mounting one vertical edge of each of said filter plates to a respective one of said parallel side plates;
   a filtration media strip draped vertically between each of said filter plates, each strip positioned against a respective cover sheet for first receiving flow passing into said cover sheets from said filter chambers;
   a series of pairs of hose seals, each pair associated with a respective said intermediate space, said hose seals extending completely across the spaces between said side plates through aligned openings in either of said side plates, one of said hose seals in said pair extending across said top of said associated filtration chamber and the other hose seal across said bottom thereof;
   means for controllably inflating said hose seals to expand the same to exert sealing pressure against opposite filter plates during a cycle of filter operation;
   means for evacuating each of said hose seals to retract said hoses when said cycle of filter operation is over;
   supply means for introducing liquid to be filtered into each said filtration chamber under pressure;
   collection means fluidly connected to said collection passages at the bottom of said filter plates and extending below said collection passages and cover sheets for collecting filtered liquid passing through said cover sheets and into said collection passages.

2. The apparatus according to claim 1 further including filter media transport means for lowering each media strip out of its associated intermediate space after retraction of said hose seals to enable removal of filter cake, and for thereafter elevating said filter media strips back into said filtration chambers.

3. The apparatus according to claim 2 wherein pairs of said media strips have lower ends connected together below each filter plate so that each of said pairs of media strips form loops extending between said intermediate space between adjacent pairs of filter plates and said pair of media strips are thereby moved together by said media transport means.

4. The apparatus according to claim 3 wherein each filter media strip includes a carrier belt segment at the top thereof, said media transport means includes roller means above said housing and means for rotating said roller means to cause winding and unwinding of said carrier belt segments on and off said roller means, and wherein a shaft weight is disposed in said loop formed by the connected lower ends of said filter media strip pairs to cause lowering of said filter media strips as said media transport roller means unwinds said carrier belt segments.

5. The apparatus according to claim 2 wherein said means mounting one side of each of said filter plates to a respective housing side plate includes a series of vertical guide bars attached inside of said housing side plate, said filter plates each having portions along each vertical side slidably fit to a respective one of said guide bars to enable sliding assembly of said filter plates to said housing.

6. The apparatus according to claim 1 further including a dewatering dual diaphragm assembly centrally interposed in said each of said intermediate spaces between each pair of said filter plates, said dual diaphragm assembly disposed between said media strips in said intermediate space and subdividing said intermediate space into two filtering chambers, each diaphragm assembly including a pair of oppositely expandable diaphragms, each diaphragm facing a media strip and a face of an adjacent cover sheet of the associated filter plate, and means for inflating the inside of each diaphragm to enable compression of filter cake accumulated on the opposite surface of each filter media strip and thereafter deflating and retracting said diaphragm.

7. The apparatus according to claim 6 further including a diaphragm support frame including a planar support plate between said diaphragms and a rectangular frame surrounding said support plate and means clamping the perimeter of each of said diaphragms between said frame and support plate.

8. The apparatus according to claim 1 further including a vertical backing support plate mounted in said housing edgewise to bear against each hose seal on a side away from said intermediate spaces thereby stiffening said hose seals against the pressure of said liquid in said intermediate spaces.

9. The apparatus according to claim 1 further including a tension bar mounted within each hose seal, a plug fixed to each end of said tension bar, each plug received within a respective opposite end of said hose seal, to thereby neutralize the endwise thrust created by the inflation of said hose seals.

10. The apparatus according to claim 9 wherein said tension bar has a serpentine shape across the width thereof whereby controlling retraction of said hose seal by causing folding of said hose seal about said tension bar shape.

11. The apparatus according to claim 1 wherein said means for introducing liquid to be filtered includes a series of slits in one of said side plates and means for introducing said liquid into said slits.

12. A method of filtering liquid comprising the steps of defining a series of intermediate spaces between vertically extending filter plates, said spaces having a top and bottom, each said filter plate having opposite faces able to pas flow of said liquid from said intermediate spaces into vertical internal passages in each of said filter plates;
draping pairs of filter media strips between each filter plate, each strip overlying one of said opposite faces of one of each said filter plates;
mounting opposite vertical edges of each said filter plate to a respective one of a pair of housing plates;
sealing the intermediate spaces by inflating an elongated inflatable member located at the top and bottom of the intermediate spaces to bear against the media strips overlying the opposite faces of adjacent pairs of said filter plates; and introducing liquid to be filtered into each intermediate space under pressure whereby causing filtering flow through each filter media strip and into said internal passages of said filter plates.

13. The method according to claim 12 further including the step of lowering each of said filter media strip pairs out of a respective intermediate space after ceasing flow of liquid thereto and retraction of said inflatable member by releasing the liquid pressure held therein to carry out filter solids accumulating on said filter media strips; and thereafter elevating said filter media strips back into said intermediate spaces.

14. The method according to claim 13 further including the step of winding and unwinding carrier belts, each integral with one of said filter media strips to cause said lowering and elevating of said filter media strips.

15. The method according to claim 12 further including subdividing said intermediate spaces into a pair of filter chambers by interposing a dual diaphragm assembly centrally between each adjacent pair of filter plates, and expanding each diaphragm in said assembly towards an opposite filter media strip after discontinuing liquid flow to said filter chambers to dewater accumulated filter solids thereon.

* * * * *